(12) United States Patent
Kann

(10) Patent No.: US 10,549,455 B2
(45) Date of Patent: Feb. 4, 2020

(54) UTILIZATION OF FINE MINERAL MATTER IN THE CONVERSION OF NON-BIODEGRADABLE PLASTIC AND IN REMEDIATION OF SOILS POLLUTED WITH NON-BIODEGRADABLE PLASTIC

(71) Applicant: Radical Plastics Inc., Marblehead, MA (US)

(72) Inventor: Yelena Kann, Marblehead, MA (US)

(73) Assignee: Radical Plastics Inc., Marblehead, MA (US)

( * ) Notice: Subject to any disclaimer, the term of this patent is extended or adjusted under 35 U.S.C. 154(b) by 0 days.

(21) Appl. No.: 16/293,814

(22) Filed: Mar. 6, 2019

(65) Prior Publication Data

US 2019/0291302 A1 Sep. 26, 2019

Related U.S. Application Data

(60) Provisional application No. 62/647,818, filed on Mar. 25, 2018.

(51) Int. Cl.
*B29B 17/02* (2006.01)
*C08L 23/12* (2006.01)
*C08L 23/06* (2006.01)
*C10L 5/02* (2006.01)

(52) U.S. Cl.
CPC .............. *B29B 17/02* (2013.01); *C08L 23/06* (2013.01); *C08L 23/12* (2013.01); *C10L 5/02* (2013.01)

(58) Field of Classification Search
CPC . B29B 7/00; B29B 17/02; C08L 23/06; C08L 23/12; C10L 5/02
See application file for complete search history.

(56) References Cited

U.S. PATENT DOCUMENTS

2014/0364663 A1* 12/2014 Ramesh .................. C08J 11/16
 585/241
2015/0037865 A1 2/2015 Weder
2016/0311728 A1* 10/2016 Swensen .................. C05D 9/02

FOREIGN PATENT DOCUMENTS

WO PCT/US20 16/02848 10/2016

OTHER PUBLICATIONS

PCT Search Report, dated May 29, 2019; PCT/US2019/021066.
A.C. Albertsson et al., "Degradation product pattern and morphology changes as means to differentiate abiotically and biotically aged degradable polyethylene", Polymer, vol. 36, No. 16, 3075-3083, 1995.

(Continued)

*Primary Examiner* — Frances Tischler
(74) *Attorney, Agent, or Firm* — Nutter McClennen & Fish LLP

(57) ABSTRACT

The disclosed invention describes a novel approach to the utilization of the fine mineral matter derived from coal and/or coal refuse (a by-product of coal refining) to convert a non-biodegradable plastic into a biodegradable plastic. The fine mineral matter could also be based on volcanic basalt, glacial rock dust deposits, iron potassium silicate and other sea shore mined deposits. The conversion of the non-biodegradable plastic into biodegradable plastic in soil further increases nutrients availability in soil with the transition metals released as a result of biodegradation of the biodegradable plastic.

15 Claims, 3 Drawing Sheets

(56) References Cited

OTHER PUBLICATIONS

R. Arnaud et al, "Photooxidation and biodegradation of commercial photodegradable polyethylenes", Polymer Degradation and Stability 46 (1994) 211-224.
U.S. Department of Agriculture. 2009. Summary Report: 2007 National Resources Inventory, Natural Resources Conservation Service, Washington, DC, and Center for Survey Statistics and Methodology, Iowa State University, Ames, Iowa. 123 pages. http://www.nrcs.usda.gov/technical/NRI/2007/2007_NRI_Summary.pdf.
Gerald Scott, "'Green' Polymers", Polymer Degradation and Stability 68 (2000) 1-7.
G. Scott, "Trends", Polym. Sci., 1997 (5), 361.
J. Garthe, "Managing used agricultural plastics, in: Production of vegetables, strawberries, and cut flowers using plasticulture", 2004, Natural Resource, Agriculture and Engineering Service (NRAES), Ithaca, NY. (W. Lamont, ed.).
La Revue De L'Institut Veolia Facts Reports, 2019, pp. 62-74.
Pete Halley, et al, "Developing Biodegradable Mulch Films from Starch-Based Polymers," Starch/Stärke 53 (2001) 362-367.
Subrahmaniyan Kasirajan et al. "Polyethylene and biodegradable mulches for agricultural applications: a review", Agron. Sustain. Dev. (2012) 32:501-529.
Carol Miles et al, "Searching for Alternatives to Plastic Mulch", WSU Vancouver Research and Extension Unit, 1919 NE 78th Street, Vancouver, Washington; (2005); tel # (360) 576-6030, 2005, milesc@wsu.edu, http://agsyst.wsu.edu.
J.P. Warnick et al, "Weed suppression with hydramulch, a biodegradable liquid paper mulch in development", Renewable Agriculture and Food Systems: 21(4); 216-233, 2006.
R. Chandra, et al, Department of Polymer Technology and Applied Chemistry, Delhi College of Engineering, Delhi-110006, India, "Biodegradable Polymers", Prog. Polym. Sci., vol. 23, 1273-1335, 1998.
Norman C. Billingham et al, "Environmentally Degradable Plastics Based on OXO-Biodegradation of Conventional Polyolefins", Springer US 2003, Univ. of Sussex, Brighton, BN1 9QJ, UK, and EPI Ltd., Unit 7, Dunston Place, Dunston Rd., Chesterfield, Derbyshire, S41 8NL, UK, email: n.billingham@sussex.ac.uk.
Emo Chiellini et al, "Biodegradation of thermally-oxidized, fragmented low-density polyethylenes", Polymer Degradation and Stability 81(2), 2003, 341-351.
Ignacy Jakubowicz, "Evaluation of degradability of biodegradable polyethylene (PE)", Polymer Degradation and Stability 80 (2003) 39-43.
Manuel González-Guerrero et al.,"Transition Metal Transport in Plants and Associated Endosymbionts:Arbuscular Mycorrhizal Fungi and Rhizobia", Frontiers in Plant Science, Jul. 2016, vol. 7, Article 1088.
Jinsheng Gao, "Coal, Oil Shale, Natural Bitumen, Heavy Oil and Peat—vol. I—Coal, Oil Shale, Natural Bitumen, Heavy Oil, and Peat", College of Resource and Environment Engineering, East China University of Science and Technology, Shanghai, China, © Encyclopedia of Life Support Systems (EOLSS) (1996).

\* cited by examiner

UTILIZATION OF FINE MINERAL MATTER IN THE CONVERSION OF NON-BIODEGRADABLE PLASTIC AND IN REMEDIATION OF SOILS POLLUTED WITH NON-BIODEGRADABLE PLASTIC

CROSS-REFERENCE TO RELATED APPLICATIONS

This application claims the benefit of U.S. Provisional Application No. 62/647,818, filed Mar. 25, 2018, the contents of which are incorporated herein by reference in its entirety.

FIELD OF THE INVENTION

The invention generally relates to the conversion of a non-biodegradable plastic into a biodegradable plastic. More specifically, in one embodiment, a method for remediation and treatment of soil using the biodegradable plastic is described.

BACKGROUND OF THE INVENTION

Polyolefin Based Plastic Products in Soil

Over the past 60 years, agricultural output and productivity has significantly increased and plastic materials, mainly polyolefins (e.g. low density polyethylene (LDPE), high density polyethylene (HDPE), linear low density polyethylene (LLDPE), polypropylene (PP), and their copolymers and mixtures) made substantial contribution to this development. The main products based on polyolefins are films, drip-irrigation tubing and tapes. For the mulch film alone, it is estimated that about 1 million tons is used worldwide on over 30 million acres of land (P. Halley at al. "Starch" published in 2001 (53), page 362-367). For the USA these numbers in 2004 corresponded to about of 130,000 tons of mulch film usage annually, covering over 185,000 acres of agricultural land (J. P. Warnick at al. "Renewable Agriculture and Food Systems" published in 2006 (21), 216-233). These numbers have continued to grow significantly due to the benefits of mulch films such as increased soil temperature, reduced weed growth, moisture conservation, reduction of certain insect pests, higher crop yields, and more efficient use of soil nutrients.

One major drawback of polyolefins is their resistance to chemical, physical and biological degradation, along with the problem of removal and disposal of agricultural films and other agricultural products after their useful lifetime. If not removed, they tend to accumulate as waste, interfere with root development of the subsequent crop and create serious environmental problems. The cost of removing films from the soil and cleaning them is prohibitively high. This is the main reason why the farmers usually incorporate them into the soil by rototilling, or sometimes burn them in the fields. The problems with disposal of agricultural plastic waste and soil contamination with plastic waste become more and more severe because of increasing usage of plastics.

It is also known that since 2004 well over 1.5 million tons of plastic (primarily polyolefins) mulch film was used in USA. With these practices, it is expected that significant amounts of these plastics are accumulated in soil as waste. It is also known that soils polluted with plastic lose their agricultural value and need to be remediated regularly.

A possible solution to the agricultural plastic waste management would be deployment of biodegradable materials. Biodegradability could be achieved by utilization of soil biodegradable polymers, such as hydrolysable polyesters, e.g. poly(hydroxyalkanoates) (PHA), poly(butylene succinates) and their copolymers. However, despite many years of research and development, these polymers still did not make significant impact in the marketplace due to their inconsistent soil biodegradability and in a majority of cases the necessity of removal and composting, high cost, life cycle assessment (LCA) and inferior mechanical properties.

A far more promising solution lies in converting polyolefins, the polymers of choice for agricultural film markets, into biodegradable materials that further enriches the agricultural soil with nutrients. This is a quite an ambitious task as polyolefins are known to be bioinert due to their hydrophobicity and high molecular weights.

Transition Metals as Soil Nutrients

Transition metal salts and their mixtures are known to be important plant nutrients: iron, copper, zinc, molybdenum, among others, are needed to support photosynthesis, tolerance to biotic and abiotic stress or nitrogen fixation. However, plants often grow in soils with limited bioavailability (especially of metals in reduced form) and therefore rely on microorganisms for metal uptake. The U.S. Publication. No. 20160311728A1 teaches that coal-derived mineral matter mixed with soil is an effective soil amendment. It increases the silt and clay fractions of the soils and improves soil texture. However, it fails to provide a solution for the soils polluted with non-biodegradable waste.

SUMMARY OF THE INVENTION

An object of the present invention is to utilize fine mineral matter to convert a non-biodegradable plastic into a biodegradable plastic. The fine mineral matter is either derived from coal refuse and/or fine-size coal or mined from natural resources including volcanic basalt, glacial dust deposits, iron potassium silicate and/or sea shore deposits.

Yet another object of the present invention is to improve the soil quality by converting a non-biodegradable plastic in soil into a biodegradable plastic.

Yet another object of the present invention is treatment of the soil by adding the biodegradable plastic-based product comprising the non-biodegradable plastic-based product mixed with the fine mineral matter such that the biodegradable plastic-based product releases a plurality of transition metals.

Yet another object of the present invention is to provide a biodegradable polyolefin composition that biotically degrades in the environment without having adverse effects.

Yet another object of the present invention is to provide a modified soil composition comprising a biodegradable plastic with increased amount of nutrients and improved fertility.

Yet another object of the present invention is the beneficial use of the coal derived fine mineral matter otherwise accumulating as refuse and requiring disposal, and in supporting clean air practices supporting the separation of fine coal fractions otherwise producing fly ash and air pollutants if the coal is burned in a power plant.

In an embodiment of the present invention, the fine mineral matter is either derived from coal refuse and/or fine-size coal with froth flotation separation or mined from natural resources including volcanic basalt, glacial dust deposits, iron potassium silicate and/or sea shore deposits with particle sizes ranging from less than about 50 µm to about 2 µm.

In another embodiment of the present invention, a method of conversion of a non-biodegradable plastic into a biodegradable plastic is described. The method comprises the steps of obtaining an amount of fine mineral matter and blending (melt blending, dry blending or compounding) the fine mineral matter with the non-biodegradable plastic, thereby converting the non-biodegradable plastic into the biodegradable plastic.

In another embodiment of the present invention the non-biodegradable plastic to be converted is a polyolefin-based plastic such as LDPE, HDPE, LLDPE, PP and their copolymers and mixtures. In an alternative embodiment, the non-biodegradable plastic is a hydrocarbon-based polymer from the list which includes, but is not limited to, polybutenes, polymethylpentenes, polystyrene, styrene/acrylonitrlile copolymers, acrylonitrile/butadiene/styrene terpolymers, acrylate/styrene/acrylonitrile terpolymers, sterene/butadiene/styrene and styrene/isoprene/styrene copolymers, acrylic, vinyl based polymers, polycarbonates, and their mixtures and copolymers. In addition, polyesters, polyethers, polyether esters, polyurethanes, and polyacetals, polyisoprene, polybutadiene are included in the list.

In another embodiment of the present invention, a method of conversion of a non-biodegradable plastic in soil into a biodegradable plastic is described. The method comprises the steps of obtaining an amount of fine mineral matter and blending (melt blending, dry blending or compounding) the fine mineral matter with soil comprising the non-biodegradable plastic to convert the non-biodegradable plastic in soil into the biodegradable plastic.

In another embodiment of the present invention, a biodegradable polyolefin composition comprises a non-biodegradable polyolefin-based product and an amount of fine mineral matter, wherein the non-biodegradable polyolefin-based product is blended (melt blending, dry blending or compounding) with the fine mineral matter.

In another embodiment of the present invention, a modified soil composition comprises a non-biodegradable polyolefin and an amount of fine mineral matter, wherein the non-biodegradable polyolefin is converted into a biodegradable polyolefin when melt blending, dry blending or compounding with the fine mineral matter.

In another embodiment of the present invention, a method for treatment of soil is described. The method comprises the steps of adding a biodegradable plastic-based product (formed by blending an amount of fine mineral matter and a non-biodegradable plastic-based product) in the soil. The biodegradable plastic-based product releases a plurality of transition metals to increase nutrient availability in the soil.

In another embodiment of the present invention, a method for remediation of soil is described. The method comprises the steps of obtaining an amount of fine mineral matter comprising a plurality of transition metals, and mixing the fine mineral matter with soil to form a blend, wherein the soils comprises a non-biodegradable plastic-based product. The plurality of transition metals causes the oxidative degradation of the non-biodegradable plastic-based product present in the blend to form a biodegradable plastic-based product. The biodegradable plastic-based product formed releases the plurality of transition metals to increase nutrient availability in the soil.

From the foregoing disclosure and the following more detailed description of various embodiments, it will be apparent to those skilled in the art that the present invention provides a way to utilize fine mineral matter to convert non-biodegradable plastic into biodegradable plastic. Particularly significant in this regard is the potential the invention affords for providing a relatively simple, low cost and efficient conversion of non-biodegradable plastic into biodegradable plastic. Additional features and advantages of various embodiments will be better understood in view of the detailed description provided below.

DETAILED DESCRIPTION OF THE INVENTION

Figure 1:
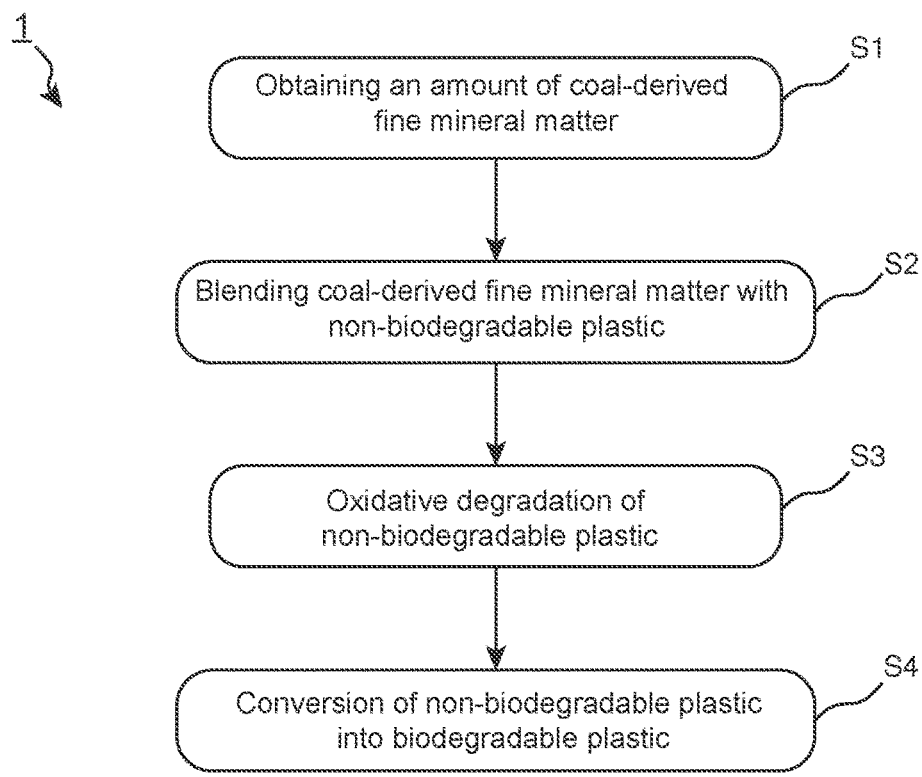
FIG. 1 represents a flow diagram illustrating the method of conversion of the non-biodegradable plastic into biodegradable plastic according to an embodiment of the invention.

The following detailed description represents the best currently contemplated techniques for carrying out the invention. The description herein is not limiting, but rather is made merely for the purpose of illustrating the general principles of the invention.

A non-biodegradable plastic can be made biodegradable via an oxidative degradation process catalyzed in the presence of light, heat or pro-degrading additives. During this oxidative degradation the molecular chains of non-biodegradable plastic are reduced by oxidation, creating carboxylic acids, alcohols and ketones. The originally hydrophobic macromolecules become more hydrophilic and favour extracellular enzyme activity leading to subsequent breakdown of polymer chains (see e.g., N. C. Billingham, E. Chiellini, A. Corti, R. Baciu and D. W. Wiles, in ENVIRONMENTALLY DEGRADABLE PLASTICS BASED ON OXO-BIODEGRADATION OF CONVENTIONAL POLYOLEFINS, Springer US 2003). The pro-degrading additives used for oxidative degradation contain different mixtures of transition metal salts (e.g., iron, copper, nickel, cobalt, zinc, manganese, titanium, zirconium, molybdenum), with or without alkaline earth salts (e.g., calcium, magnesium) and with or without the presence of other ingredients such as substituted benzophenones, unsaturated organic compounds, peroxides, biodegradable plasticizers, waxes, etc.

The present invention utilizes the fine mineral matter to convert the non-biodegradable plastic into biodegradable plastic in a preferred embodiment. The fine mineral matter is derived from coal and/or mined from natural resources, such as volcanic basalt, glacial rock dust deposits, iron potassium silicate and other sea shore deposits. The non-biodegradable plastic is completely degraded and converted into biodegradable plastic due to oxidative degradation of non-biodegradable plastic caused by the transition metals present in the fine mineral matter and other additives participating in electron exchange and regeneration of reduced ions of transition metals. The biodegradable plastic undergoes biodegradation to remediate and treat the soil, thereby improving the texture and increasing the nutrients availability.

Fine Mineral Matter Derived from Coal

Coal comprises low-quality coal mixed with fine mineral matter containing a plurality of elements, among them transition metal compounds such as Fe, Cu, Mn, Mo, Zn, Co and alkali/alkali earth metals such as K, Ca, Mg. The residual fine mineral matter is discarded as a "waste" after coal cleaning processes and ends up either filling ravines, streams, mountain hollows or is randomly disposed in piles near the mine sites.

Another source of deriving fine mineral matter is its separation during recovery of coal refuse. It is known that about 1 billion tons of coal refuse is discarded each year.

The fine mineral matter inherent in coal refuse or fine-size coal is separated with froth flotation with particle sizes ranging from less than about 50 μm to about 2 μm. The separation process separates fine-size coal particles by selective attachment of air bubbles to coal particles, causing them to be buoyed to the surface of a coal-water suspension system where they are collected in a froth. Since fine mineral matter particles remain unattached, they are not recovered in the froth and are present in the tailing or the underflow. The fine mineral matter is recovered when the flotation cell is drained. This process deals with fine particles in a turbulent, aqueous system where specific gravity is not as significant as the surface properties of the particles. This is one of the principal processes used for cleaning fine-sized coal, however other suitable techniques can also be used.

The concentration of metals and metal salts depends on the analytical method being used and is typically measured by X-ray techniques: fluorescence (XRF) and diffraction (XRD) and Inductively Coupled Plasma Acid Elemental Analysis (ICP-AES). The X-ray methods are non-destructive and determine the elemental composition of materials in bulk. The ICP methods require digestion of minerals in either strong acids to estimate the concentration of elements that could potentially become "environmentally available" (ICP-AES) or in milder dissolution solvents to provide more realistic soil availability. The elements bound in silicate structures, e.g., are not normally dissolved by these procedures, as they are not usually mobile in the environment. This technique is generally used to show compliance in EPA 503 heavy metal regulations.

The concentration of the transition metals and the alkali/alkali earth metals in the coal refuse varies for different coal sites and are presented in the Table 1 below. The concentrations measured are based on the ICP-AES method utilizing nitric acid, hydrochloric acid and hydrogen peroxide in a heated digester. The compositions of different refuses were shown to differ, but all had Iron as the major element, and the rest of the elements were also present in each refuse. Table 1 confirms that the concentration of toxic and regulated heavy metals is below regulatory limits, which are also provided.

TABLE 1

Fine mineral matter ICP-AES and WDXRF tests.

| | Coal derived fine mineral matter | | EN 17033: 2018 Upper limit | Bio Solids Upper limit | EPA 40 CRF Part 503 in soil Sludge | | |
|---|---|---|---|---|---|---|---|
| Elements | WDXRF ppm In bulk | ICP-AES, ppm | ICP, ppm | ICP, ppm Strong digestion | Max concen. ppm | Annual loading rates, lb/A/yr | Cumulative loading rates, lb/A |
| Aluminum | | 15,200-15,700 | | | | | |
| Arsenic | <20 | 5-11 | | <41 | <75 | 1.8 | 36.6 |
| Barium | | 300-500 | | | | | |
| Beryllium | | 0.9-1.1 | | | | | |
| Boron | | 5-17 | | | | | |
| Cadmium | | 0-0.32 | <0.5 | <39 | <85 | 1.7 | 34.8 |
| Calcium | | 8,590-17,000 | | | | | |
| Chloride | | 23-304 | | | | | |
| Chromium | | 14-28 | <50 | <1,200 | 3,000 | 134 | 2,679 |
| Cobalt | | 8-12 | | <20 | | | |
| Copper | | 23-43 | <50 | <1,500 | 4,300 | 67 | 1,340 |
| Fluoride | | 3-5.6 | | | | | |
| Iron | | 18,900-30,100 | | | | | |
| Lead | 20 | 14-20 | <50 | <300 | 420 | 14 | 375 |
| Magnesium | | 4,780-5,190 | | | | | |
| Manganese | | 193-253 | | | 5,500 | | |
| Mercury | | 0.06-0.068 | <0.5 | <17 | 840 | 13.4 | 268 |
| Molybdenum | | 1-1.93 | | <18 | 57 | 0.8 | 15 |
| Nickel | | <11 | <25 | <420 | 75 | 0.8 | 16 |
| Niobium | 28 | | | | | | |
| Phosphorus | | 139-203 | | | | | |
| Potassium | | 2000-2,980 | | | | | |
| Rubidium | 150 | | | | | | |
| Selenium | | ND* | | <36 | 100 | 4 | 89 |
| Silicon | | 453-716 | | | | | |
| Silver | | ND* | | | | | |
| Sodium | | 386-1000 | | | | | |
| Strontium | 279-374 | | | | | | |
| Sulfur | | 1,920-3,300 | | | | | |
| Thorium | 20 | | | | | | |
| Tin | <50 | ND* | | | | | |
| Tungsten | <10 | | | | | | |
| Uranium | <20 | | | | | | |

TABLE 1-continued

Fine mineral matter ICP-AES and WDXRF tests.

| Elements | Coal derived fine mineral matter | | EN 17033: 2018 | EPA 40 CRF Part 503 in soil | | | |
|---|---|---|---|---|---|---|---|
| | | | Upper limit | Bio Solids Upper limit | | Sludge | |
| | WDXRF ppm In bulk | ICP-AES, ppm | ICP, ppm | ICP, ppm Strong digestion | Max concen. ppm | Annual loading rates, lb/A/yr | Cumulative loading rates, lb/A |
| Vanadium | 130 | 13-16 | | | | | |
| Yttrium | 40-45 | | | | | | |
| Zinc | | 71-83 | <150 | <2,800 | 7,500 | 125 | 2,500 |

*ND = Not Detectable

Fine Mineral Matter from Other Naturally Occurring Sources

Other fine mineral matter could be based on volcanic ash deposits mined in Utah and sold under the trade name Azomite. It is marketed as mineralized soil fertilizer, but also includes transition metals in its composition and is approved for organic farming.

Another example of fine mineral matter could be based on volcanic basalt, e.g., a product mined by Cascade Minerals. It is also used for soil mineralization and is approved for organic farming.

Another example of fine mineral matter could be based on glacial rock dust deposits, e.g., glacial rock dust deposits sold by Gaia Green Product Ltd.

Another example is iron potassium silicate, containing 20% iron oxide FeO2, e.g., products supplied by Gaia Green Product Ltd based on ancient algae sea shore mined deposits.

Conversion of Non-Biodegradable Plastics into Biodegradable Plastics by Utilization of Fine Mineral Matter In the preferred embodiment of the present invention shown in FIG. 1, a flow diagram 1 of a method of conversion of a non-biodegradable plastic into the biodegradable plastic is described. The non-biodegradable plastic to be converted is a polyolefin-based plastic such as LDPE, HDPE, LLDPE, PP and their copolymers and mixtures. In an alternative embodiment, the non-biodegradable plastic is a hydrocarbon based polymer from the list which includes, but is not limited to polybutenes, polymethylpentenes, polystyrene, styrene/acrylonitlrile copolymers, acrylonitrile/butadiene/styrene terpolymers, acrylate/styrene/acrylonitrile terpolymers, sterene/butadiene/styrene and styrene/isoprene/styrene copolymers, acrylic, vinyl based polymers, polycarbonates, and their mixtures and copolymers. In addition, polyesters, polyethers, polyether esters, polyurethanes, and polyacetals are included in the list.

The method of conversion illustrated in flow diagram 1 and as shown in FIG. 1 begins with S1 where an amount of fine mineral matter is obtained. The fine mineral matter is separated from the coal refuse and/or fine-size coal with the froth flotation separation process described above. The fine mineral matter could also be mined from natural sources, such as volcanic basalt, glacial rock dust deposits, iron potassium silicate and other sea shore mined deposits. The particle size of the fine mineral matter ranges from less than about 50 μm to about 2 μm. The fine mineral matter comprises at least one and more preferably at least two transition metals selected from the group consisting of Fe, Cu, Mn, Mo, Zn, Co, or combinations thereof to cause the oxidative degradation of the non-biodegradable plastic. These transition metals in the fine mineral matter have concentrations measured with ICP-AES method utilizing nitric acid, hydrochloric acid and hydrogen peroxide in a heated digester and are defined in the range shown in Table 2.

TABLE 2

Concentration range of the transition metals in the fine mineral matter.

| Transition Metal | Concentrations Range in ppm |
|---|---|
| Fe | 14,000-45,000 |
| Cu | 10-50 |
| Mn | 100-700 |
| Mo | 1-2 |
| Zn | 20-120 |
| Co | 10-15 |

The fine mineral matter further comprises a promoter from the list of Ca, K, Mg or combinations thereof, to promote the oxidative degradation of the non-biodegradable plastic. The promoter in the fine mineral matter has concentrations defined in the range shown in Table 3. Other alkaline/alkaline earth containing minerals with similar fractions of soluble cations can also be used as promoters for oxidative degradation.

TABLE 3

Concentration range of the promoter in the fine mineral matter.

| Promoter (Alkali/Alkali Earth Metal) | Concentrations Range in ppm |
|---|---|
| Ca | 1,000-18,000 |
| K | 600-4,000 |
| Mg | 20-8,000 |

In step S2, the fine mineral matter is melt blended, dry blended, or compounded with the non-biodegradable plastic. The fine mineral matter is added to the non-biodegradable plastic directly or via masterbatches or concentrates, wherein the masterbatches or concentrates are well-dispersed mixtures of a polymer and high percentages of one or more components (e.g., fine mineral matter and additives) in known proportions for use in blending in appropriate amounts with the basic polymer in the preparation of a compound. Masterbatches or concentrates can be prepared by any known melt blending techniques, preferably extrusion. Single or twin screw extruders with different L: D (length to diameter) ratios can be used. The concentrations of the fine mineral matter in the masterbatches are believed to be in the range of about 3 to about 50 wt. %. The concentration of the fine mineral matter in the non-biodegradable plastic is determined by at least one of the factors comprising, composition of the transition metals, specifics of the non-biodegradable plastic resin, climatic conditions and desired useful lifetime of the formulated biodegradable plastic.

In step S3, the non-biodegradable plastic undergoes oxidative degradation abiotically. The transition metals in the fine mineral matter catalyze oxidative degradation and conversion of the non-biodegradable plastic into the biodegradable plastic. In case of polyolefins and other hydrocarbon-based polymers sensitive to radical chain processes, the rate-determining part of the degradation process is the oxidation segment, commonly called peroxidation. Hydrocarbon polymers vary in their ability to resist (or undergo) peroxidation. Thus, the oxidative stability increases from natural rubber (cis-poly(isoprene)) to poly(butylene) to polypropylene to polyethylene to polyvinyl chloride. Within polyethylenes, due to their chemical and morphological characteristics, LDPE and LLDPE are more susceptible to oxidative degradation than HDPE.

Abiotic peroxidation of the polyolefins produces vicinal hydroperoxides. This process is particularly favored in poly-α-olefins, such as polypropylene due to the susceptibility of the tertiary carbon atom to hydrogen abstraction. The vicinal hydroperoxides are unstable and can be converted to free radicals under heat and/or UV light. These radicals in turn initiate new oxidation chains. Since the monomolecular hemolytic decomposition of hydroperoxide groups into free radicals requires relatively high activation energies, this process becomes effective only at temperatures in the range of 120° C. However, in the presence of catalytic amounts of transition metal ions, hydroperoxides decompose at room temperature by a redox mechanism shown in the Reactions 1 below.

Reactions (1)

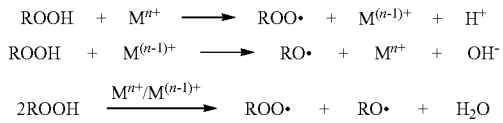

These free radicals enter a chain reaction with oxygen and C—H bonds in the non-biodegradable plastic to yield a range of oxidation products. The extent of oxidative degradation of non-biodegradable plastic (all above mentioned polymers) strongly depends on the number of other factors, including their composition, purity, and glass transition temperature.

The challenge in designing fully biodegradable systems based on polyolefins is in driving their oxidative degradation to the point when their structure is transformed from hydrophobic to hydrophilic and their molecular weight reduced to <20,000 or <15,000 g/mol. To support continuous oxidative degradation and transformation of non-biodegradable plastic it is essential to enable regeneration of reduced transition metals ions when they are used to accelerate the oxidative degradation process. Such regeneration can be driven by the redox reactions during the catalytic degradation and by providing the best conditions to promote recurring reactions. It is known that $Fe^{3+}$ is the thermodynamically favored oxidation state for iron under aerobic and alkaline conditions, whereas $Fe^{2+}$ is favored under anaerobic and acidic conditions. The present invention uses catalytic systems enabling the electron transfer and regeneration of reduced ions of transition metals, which would catalyze decomposition of the hydroperoxide groups into free radicals and consequently decomposing non-biodegradable plastic polymers according to Reactions 1 above. For that purpose the catalytic systems, in addition to containing multiple transition metal ions, also contain accelerators of redox reactions. To facilitate conversion of $Fe^{2+}$ into $Fe^{3+}$ carboxylic acids such as steric acids can be used according to Reactions 2 below.

Reactions 2, where "P" is a polymer chain,

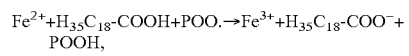

The acid accelerators could be other known carboxylic acids such as palmic acid, lauric acid, arachidic acid, nonadecylic acid, myristic acid, capric acid, valeric acid, caproic acid, butyric acid and amino acids.

Unsaturated (including polyunsaturated) carboxylic acids such as oleic, palmitoleic, vaccenic, linoleic, arachidonic, nervonic, stearidonic, erucic, rumenic, pinolenic, etc would be strongly preferred Dicarboxylic acids, tricarboxylic acids, alpha hydroxyl acids, divinylether fatty acids could be other examples of accelerators To facilitate regeneration of $Fe^{2+}$, amine compounds can be used according to Reactions 3:

Reactions 3

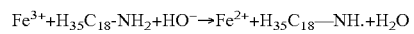

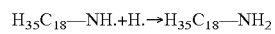

The amine accelerators could be monomeric aliphatic amines, e.g. stearyl amine, or polymer-based amines, e.g. [(3-(11-aminoundecanoyl) amino) propane-1-] silsesquioxane (polyhedral oligomeric silsesquioxane, POSS), and chitosan. They could be more preferred due to their lower leakage potential from polyethylene (due to its structure and molecular weight).

Additionally, the fine mineral matter contains other additives selected from antioxidants, pigments, IR absorbers, lubricants, unsaturated organic compounds, substituted benzophenones, peroxides, biodegradable plasticizers, waxes, UV and thermal stabilizers, biodegradable polymers and oligomers, or combinations thereof. Additives in combination with transition metals promote their ability to decompose hydroperoxides and form free radicals.

In order to control both the lifetime of a biodegradable plastic during use as well as the rate of subsequent biodegradation in the environment, the onset of degradation must be controlled by appropriate antioxidants. Antioxidants are used to inhibit oxidative degradation of plastics to provide required initial properties of plastic materials. Because the present invention uses transition metal ions to catalyze the decomposition of hydroperoxides, the utilization of primary antioxidants to control the onset of oxidative degradation would be the most preferred option. Primary antioxidants stabilize free radicals, especially peroxyl radicals, (POO.) by donating hydrogen (H), thus preventing formation of new alkyl radicals (P.) via abstraction of a hydrogen from a nearby polymer chain. The action of primary antioxidants reduces but does not prevent degradation. This in turn leads to accumulation of hydroperoxides, which after the consumption of primary antioxidants are going to be decomposed by transition metal ions at the environmental conditions. The secondary antioxidants, which are chemically reducing hydroperoxides would be less preferred (e.g. phosphites, thioesters).

Finally, in step S4, the non-biodegradable plastic is converted into the biodegradable plastic. Potential concentrations of the fine mineral matter in final products are from about 0.1 to about 3 wt. %.

According to this invention, conversion of non-biodegradable plastic into biodegradable plastic can take place in the fresh water or marine environment. The floating in water plastics, such as but not limited to polyolefins (polyethylenes, polypropylene, their copolymers, polymethylpentene, polybutene, etc), natural rubber, nylons, acrylonitrile butadiene styrene copolymers, polystyrene, would be subjected to UV light almost at all times and would go through the abiotic degradation by described above mechanisms. J.-F. Ghiglione, in his response to the Eunomia Report also describes the presence of the specific bacteria such as *Alcanivorax borkumensis* and *R. rhodochrous* which are ubiquitous in the oceans and able to biodegrade hydrocarbons. The population of such microorganisms is known to increase in response to increased availability of a food source, e.g. oil spills. The chemical break down of the polymeric molecules and their increasing hydrophilicity would also prevent ocean pollutants such as PCBs (polychlorinated biphenyls) adsorb onto the plastic surface, which is a known problem with non-biodegradable plastics.

Figure 2:
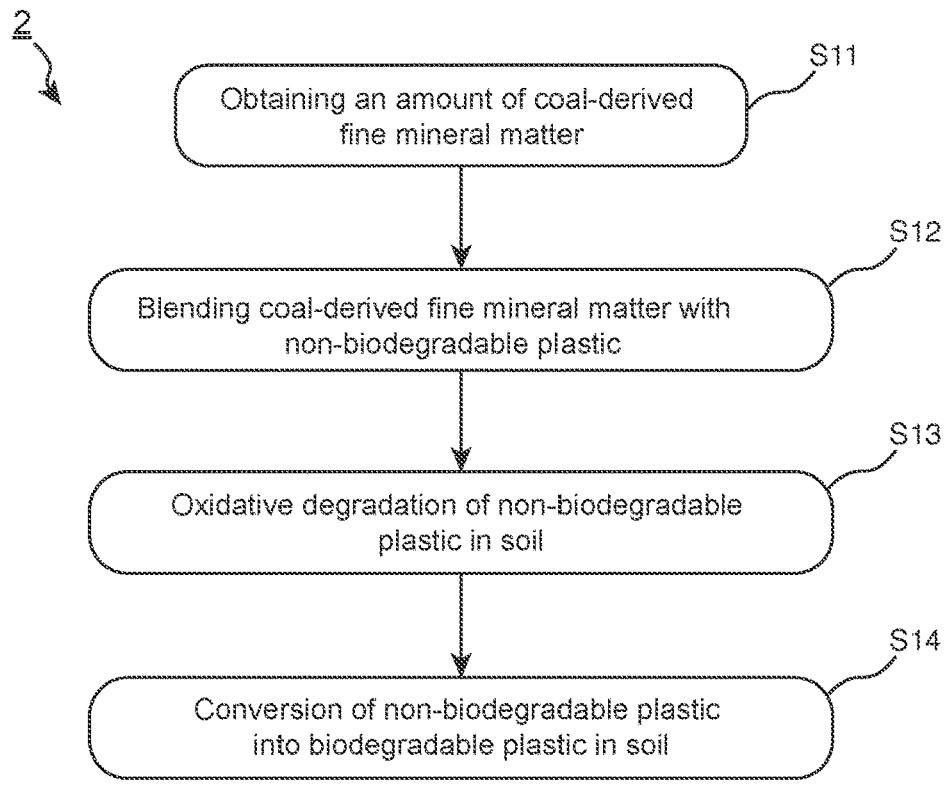
FIG. 2 represents a flow diagram illustrating the method of conversion of non-biodegradable plastic in soil into biodegradable plastic according to another embodiment of the invention.

In another embodiment of the present invention shown in FIG. 2, a flow diagram 2 of a method of conversion of a non-biodegradable plastic in soil into a biodegradable plastic is described. The operating conditions are identical to those of the preferred embodiment.

The method of conversion illustrated in flow diagram 2 and as shown in FIG. 2 starts with step S11 where an amount of fine mineral matter ranging from less than about 50 µm to about 2 µm is obtained. The concentration of the transition metals in the fine mineral matter is defined in the range shown in the Table 2 above of the present invention. The fine mineral matter comprises a transition metal from the group consisting of Fe, Cu, Mn, Mo, Zn, Co, or combinations thereof to cause the oxidative degradation of the non-biodegradable plastic.

The fine mineral matter further comprises a promoter from the group consisting of Ca, K, Mg, or combinations thereof with concentrations defined in the Table 3 above of the present invention.

In step S12, the fine mineral matter is melt-blended, dry blended or compounded comprising a non-biodegradable plastic. The fine mineral matter is added to the soil directly or via masterbatches or concentrates to achieve well-dispersed mixtures. Further, about 10 to 30 wt. % of fine mineral matter would be needed to be blended with the non-biodegradable plastics present in soil. The concentration of the fine mineral matter in the soil is determined by at least one of the factors comprising composition of the transition metals, specifics of the non-biodegradable plastic resin, climatic conditions and desired useful lifetime of the formulated biodegradable plastic. The blending can be done with a rototiller to achieve a homogeneous dispersion. A few rototilling soil treatments are recommended to promote better dispersion of the fine mineral matter in soil.

In step S13, the non-biodegradable plastic in soil undergoes oxidative degradation. The transition metals in the fine mineral matter together with other promoters, such as carboxylic acids and primary amine based compounds and alkaline and alkaline earth metals act as a catalyst promoting redox reactions and leading to oxidative degradation of the non-biodegradable plastic to convert the non-biodegradable plastic into the biodegradable plastic according to Reactions 1, Reactions 2 and Reactions 3 of the present invention described above. The promoters in the fine mineral matter further promote the oxidative degradation of the non-biodegradable plastic into the biodegradable plastic in soil.

Finally, in step S14, the non-biodegradable plastic is converted into the biodegradable plastic in soil. Potential concentrations of the fine matter in the final products are from about 0.1 to about 3 wt. %.

In another embodiment of the present invention, a biodegradable polyolefin composition is described. The biodegradable polyolefin composition comprises a non-biodegradable polyolefin-based product and an amount of fine mineral matter, wherein the non-biodegradable polyolefin-based product is melt-blended, dry blended or compounded with the fine mineral matter with particle size ranging from less than about 50 µm to about 2 µm. The concentration of the fine mineral matter in the non-biodegradable polyolefin-based product is determined by at least one of the factors comprising composition of the transition metals, specifics of the non-biodegradable plastic resin present in soil, climatic conditions and desired useful lifetime of the formulated biodegradable polyolefin. A transition metal from the group consisting of Fe, Cu, Mn, Mo, Zn, Co, or combinations thereof present in the fine mineral matter act as pro-oxidants and cause oxidative degradation of the non-biodegradable polyolefin-based product. The transition metals in the fine mineral matter have concentrations defined in the range shown in the Table 2 above of the present invention. The oxidative degradation converts the non-biodegradable polyolefin-based product into a biodegradable polyolefin composition according to the Reactions 1, Reactions 2 and Reactions 3 of the present invention described above.

In another embodiment of the present invention, a modified soil composition comprises a non-biodegradable polyolefin and an amount of the fine mineral matter with particle sizes ranging from less than about 50 µm to about 2 µm, wherein the fine mineral matter is melt-blended, dry blended or compounded with the non-biodegradable polyolefin present in the soil. The non-biodegradable polyolefin is converted into a biodegradable polyolefin when blended with the fine mineral matter. The fine mineral matter is added to the soil directly. It is believed that about 10 to about 30 wt. % of fine mineral matter would be needed to be blended with the non-biodegradable plastics present in soil. The fine mineral matter comprises the transition metal from the group consisting of Fe, Cu, Mn, Mo, Zn, Co, or combinations thereof. The transition metals in the fine mineral matter have concentrations defined in the range shown in the Table 2 of the present invention. The transition metals act as pro-oxidants and cause the oxidative degradation of the non-biodegradable polyolefin present in soil according to the Reactions 1, Reactions 2 and Reactions 3 of the present invention described above. As a result of this oxidative degradation, the non-biodegradable polyolefin gets converted into the biodegradable polyolefin to form a modified soil.

Soil Treatment and Soil Remediation with Biodegradable Plastic

The fine mineral matter containing transition metals provides soil nutrition, recovers the soil fertility and conditions the soil. The soil analysis data based on ICP using milder dissolution solvents (simulating soil conditions for metal salt dissolution) with reference to Table 4, confirms the presence of following plant nutrients:

TABLE 4

| | ICP digestion solvents | | |
|---|---|---|---|
| | strong acids ICP AES | buffered ICP | buffered ICP |
| Phosphorus (P2O5), ppm | 256 | 2.8 | 13.7 |
| Potassium, ppm | 3,298 | 80.5 | 91.4 |
| Magnesium, ppm | 4,734 | 225 | 268 |
| Calcium, ppm | 9,420 | 1,693 | 1,473 |
| Sodium, ppm | 882 | 254 | 135 |
| Sulfur SO4, ppm | 3,214 | 247 | 134 |
| Zinc, ppm | 72 | 24 | 4.9 |
| Manganese, ppm | 191 | 5 | 12 |
| Iron, ppm | 17,488 | 25 | 339 |
| Copper, ppm | 37 | 35 | 26 |

Figure 3:
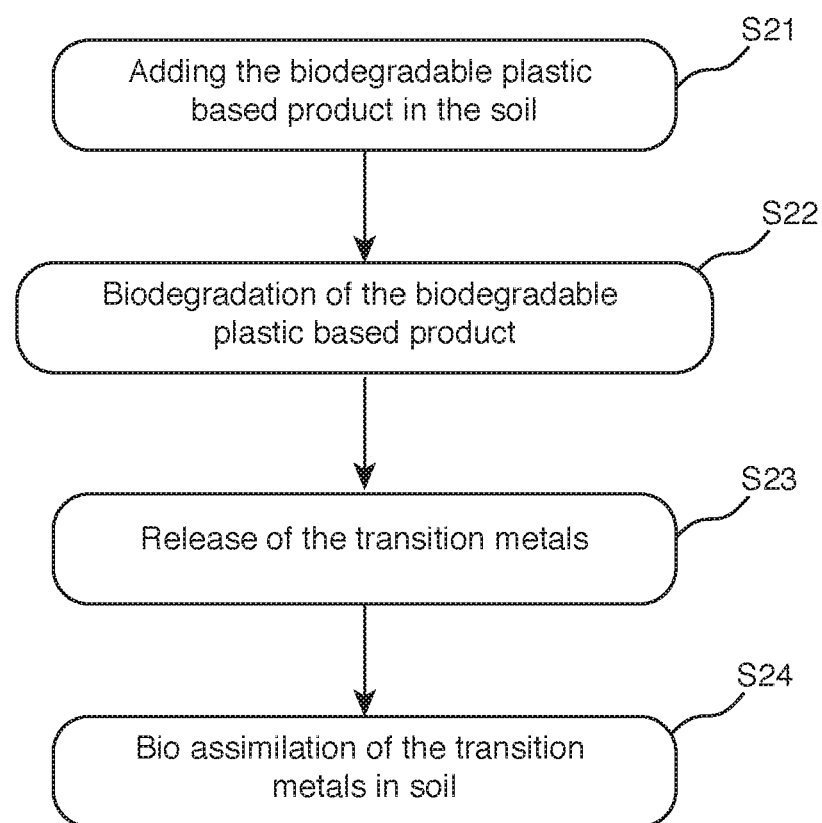
FIG. 3 represents a flow diagram illustrating the method of treatment of soil according to another embodiment of the invention.

In another embodiment of the present invention shown in FIG. 3, a flow diagram 3 of a method for treatment of soil is described. A biodegradable plastic-based product is added in the soil. The biodegradable plastic-based product undergoes biodegradation to treat the soil. The operating conditions are identical to those of the preferred embodiment.

The method of treatment illustrated in flow diagram 3 and as shown in FIG. 3 starts with step S21 where a biodegradable plastic-based product is added in the soil formed by melt blending, dry blending or compounding an amount of fine mineral matter with particle sizes ranging from less than about 50 µm to about 2 µm and a non-biodegradable plastic-based product according to an embodiment of the present invention.

In step S22, biodegradable plastic in soil undergoes biodegradation. The biodegradation process can be accelerated by inclusion of known microbial nutrients, e.g. poly(hydroxyalkanoates), starches, proteins, which could sustain the plastics conversion process. The extent of biodegradation would also depend on the completeness of the oxidative degradation process and soil conditions (moisture, pH, composition, temperature). The biodegradation process releases the transition metals in step S23. The released transition metals get bio assimilated in the soil in step S24 to increase the nutrient availability in soil.

Figure 4:
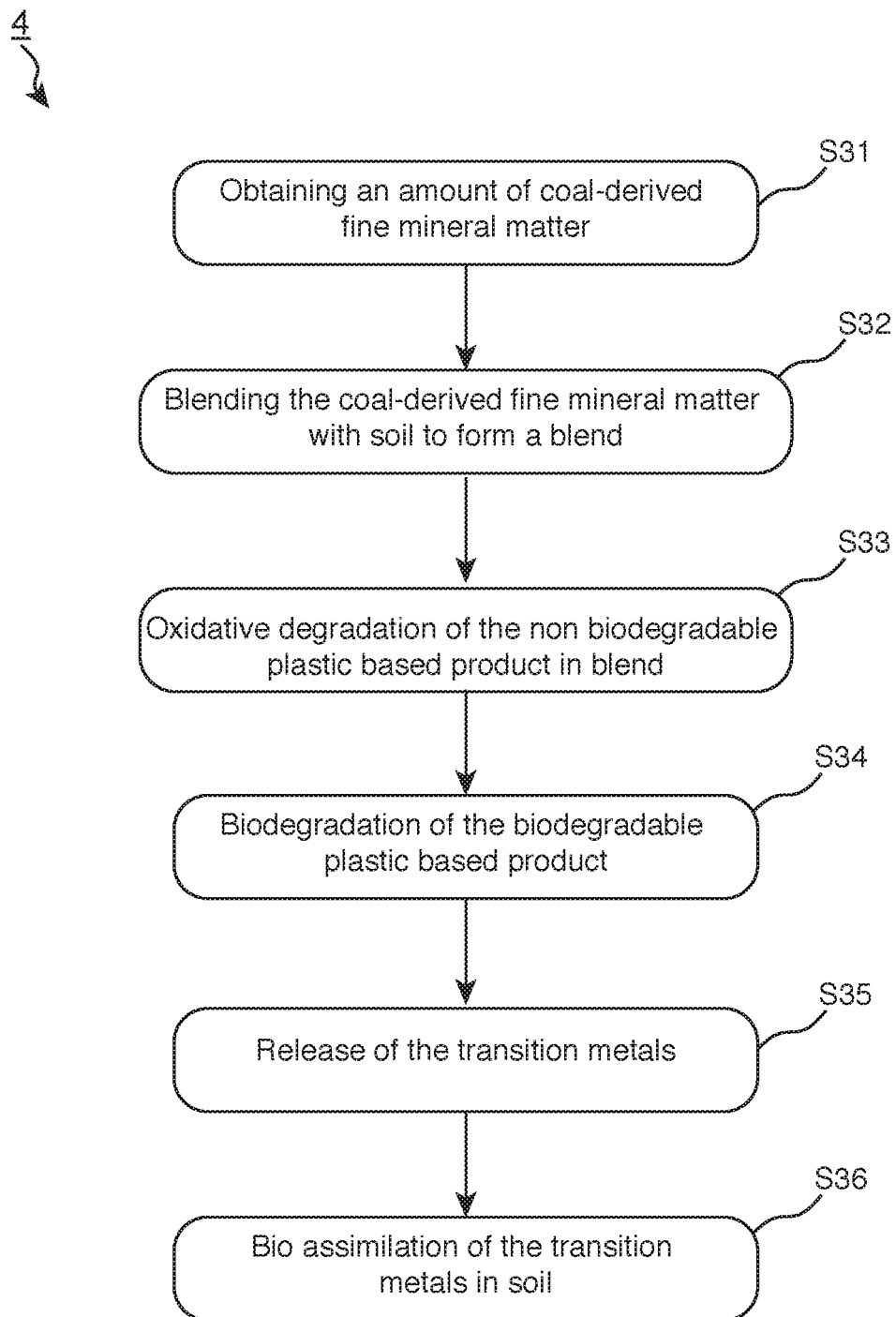
FIG. 4 represents a flow diagram illustrating the method for remediation of soil according to another embodiment of the invention.

In another embodiment of the present invention shown in FIG. 4, a flow diagram 4 of a method for remediation of soil is described. A non-biodegradable plastic-based product in soil is converted into a biodegradable plastic-based product and undergoes biodegradation to remediate the soil. The operating conditions are identical to those of the preferred embodiment.

The method for remediation illustrated in flow diagram 4 and as shown in FIG. 4 starts with step S31 where an amount of the fine mineral matter with particle sizes ranging from less than about 50 µm to about 2 µm is obtained. The fine mineral matter comprises the transition metal from the group of Fe, Cu, Mn, Mo, Zn, Co, or combinations thereof to cause the oxidative degradation of the non-biodegradable plastic in soil. The transition metals in the fine mineral matter have concentrations defined in the range shown in Table 2.

The fine mineral matter further comprises a promoter from the list consisting of Ca, K, Mg, or combinations thereof. The promoter in the fine mineral matter has concentrations defined in the range shown in the Table 3.

In step S32, the fine mineral matter is added to the soil directly. The blending is done preferably with a rototiller or equivalent device to achieve a homogeneous dispersion. A few rototilling soil treatments are done to promote better dispersion of the fine mineral matter in soil.

In step S33, the non-biodegradable plastic-based product in the blend undergoes oxidative degradation. The transition metals in the fine mineral matter act as pro-oxidants and cause oxidative degradation of the non-biodegradable plastic-based product to convert the non-biodegradable plastic-based product into the biodegradable plastic-based product according to Reactions 1, Reactions 2 and Reactions 3 of the present invention described above. The promoters in the fine mineral matter further promotes the oxidative degradation of the non-biodegradable plastic-based product into the biodegradable plastic-based product in soil.

In step S34, biodegradable plastic-based product in soil undergoes biodegradation. The biodegradation process can be accelerated by inclusion of known microbial nutrients, e.g., poly(hydroxyalkanoates), starches, proteins, which could sustain the plastic conversion process. The extent of biodegradation would also depend on the completeness of the oxidative degradation process and soil conditions (moisture, pH, composition, temperature). The biodegradation process releases the transition metals in step S35. The released transition metals get bio assimilated in the soil in step S36 to increase the nutrient availability in the soil. The bio assimilation of the transition metals improves the soil quality and contributes to healthier plants and better soil fertility that has been reduced with time.

Method for Remediation of Soil

Another embodiment of the invention involves a method for remediation of soil involving a step of obtaining an amount of fine mineral matter with particle sizes ranging from less than about 50 µm to about 2 µm, comprising a plurality of transition metals, wherein the fine mineral matter is derived from coal and/or mined from natural resources including volcanic basalt, glacial rock dust deposits, iron potassium silicate and/or sea shore deposits, followed by a step of the fine mineral matter with soil to form a blend. The soil contains a non-biodegradable plastic-based product, wherein the plurality of transition metals cause the oxidative degradation of the non-biodegradable plastic-based product present in the blend to form a biodegradable plastic-based product, and wherein the biodegradable plastic-based product releases the plurality of transition metals to increase nutrient availability in the soil. In another embodiment, the non-biodegradable plastic is a polyolefin. Further, the non-biodegradable plastic is a hydrocarbon based polymer from the list of polybutenes, polymethylpentenes, polystyrene, styrene/acrylonitrile copolymers, acrylonitrile/butadiene/styrene terpolymers, acrylate/styrene/acrylonitrile terpolymers, sterene/butadiene/styrene and styrene/isoprene/styrene copolymers, acrylic, vinyl based polymers, polycarbonates, and their mixtures and copolymers, polyesters, polyethers, polyether esters, polyurethanes, polyacetals, polyisoprene, and polybutadiene.

In another embodiment, the fine mineral matter includes a transition metal from the group of Fe, Cu, Mn, Mo, Zn, Co, or combinations thereof at the following concentrations:

Fe 14,000 to 45,000 ppm;
Cu 10 to 50 ppm;
Mn 100 to 700 ppm;

Mo 1 to 2 ppm;
Zn 20 to 120 ppm; and
Co 10 to 15 ppm;
wherein ppm are measured with ICP-AES method utilizing nitric acid, hydrochloric acid and hydrogen peroxide in a heated digester.

In another embodiment, the fine mineral matter contains a promoter from the group of Ca, K, Mg or combinations thereof at the following concentrations:
Ca 1,000 to 18,000 ppm;
K 600 to 4,000 ppm;
Mg 20 to 8,000 ppm; and
alkaline/alkaline earth promoters; and carboxylic acids and/or amine promoters. In another embodiment, the fine mineral matter further contains at least one additive from the group of antioxidants, pigments, IR absorbers, lubricants, unsaturated organic compounds, substituted benzophenones, peroxides, biodegradable plasticizers, waxes, UV and thermal stabilizers, biodegradable polymers and oligomers, or combinations thereof, wherein the antioxidants are used to inhibit oxidative degradation of plastics. In another embodiment, the concentration of the fine mineral matter in final products ranges from about 0.1 to about 3 wt. %. In another embodiment, the fine mineral matter is added to the non-biodegradable plastic via masterbatches or concentrates to achieve homogeneous dispersion, wherein the concentrations of the mineral matter particles in the masterbatches are in the range of about 3 to about 50 wt. %.

Method for Treatment of Soil

Another embodiment of the invention includes a method for treatment of soil involving adding a biodegradable plastic-based product to the soil, wherein the biodegradable plastic based product is formed by melt blending, dry blending, or compounding a non-biodegradable plastic-based product, and an amount of fine mineral matter with particle sizes ranging from less than about 50 μm to about 2 μm, wherein the fine mineral matter is derived from coal and/or mined from natural resources including volcanic basalt, glacial rock dust deposits, iron potassium silicate and/or sea shore deposits, and wherein the biodegradable plastic based product releases a plurality of transition metals to increase nutrient availability in the soil. In another embodiment, the fine mineral matter contains at least one transition metal selected from the group of Fe, Cu, Mn, Mo, Zn, Co, or combinations thereof at the following concentrations:
Fe 14,000 to 45,000 ppm;
Cu 10 to 50 ppm;
Mn 100 to 700 ppm;
Mo 1 to 2 ppm;
Zn 20 to 120 ppm; and
Co 10 to 15 ppm;
wherein ppm are measured with ICP-AES method utilizing nitric acid, hydrochloric acid and hydrogen peroxide in a heated digester. In another embodiment, the concentration of the fine mineral matter in a non-biodegradable plastic-based product is determined by at least one of the factors: the composition of the transition metals, specifics of soil, specifics of the non-biodegradable polyolefin resin, climatic conditions and desired useful lifetime of the formulated biodegradable plastic-based product.

In another embodiment, the fine mineral matter includes a promoter selected from the group of Ca, K, Mg or combinations thereof at the following concentrations:
Ca 1,000 to 18,000 ppm;
K 600 to 4,000 ppm;
Mg 20 to 8,000 ppm; and
alkaline/alkaline earth promoters; and carboxylic acids and/or amine promoters. In another embodiment, the fine mineral matter further contains at least one additive selected from antioxidants, pigments, IR absorbers, lubricants, unsaturated organic compounds, substituted benzophenones, peroxides, biodegradable plasticizers, waxes, UV and thermal stabilizers, biodegradable polymers and oligomers, or combinations thereof, wherein the antioxidants are used to inhibit oxidative degradation of plastics.

One of the advantages of the present invention is that the methods according to the embodiments described utilizes the fine mineral matter to convert the non-biodegradable plastic into the biodegradable plastic. The methods illustrated can be particularly useful in the agricultural fields. The biodegradable plastic undergoes biodegradation to release the transition metals in soil and contributes toward healthier plant growth. The invention further finds its application for treatment of the non-biodegradable plastic waste polluted soil. The utilization of fine mineral matter also reduces water contamination that may be caused when the coal refuse is discarded as waste and is washed down in the ravines, rivers, lakes, seas, etc. The invention described is simple, easy, economical, environment friendly and efficient in converting the non-biodegradable plastic into the biodegradable plastic.

From the foregoing disclosure and detailed description of certain embodiments, it is apparent that various modifications, additions and other alternative embodiments are possible without departing from the true scope and spirit of the present invention. The embodiments discussed were chosen and described to provide the best illustration of the principles of the present invention and its practical applications to enable one of ordinary skill in the art to utilize the invention in various embodiments and with various modifications as are suitable to the particular use contemplated. All such modifications and variations are within the scope of the present invention as determined by the appended claims when interpreted in accordance with the benefit to which they are fairly, legally, and equitably entitled.

The invention claimed is:

1. A biodegradable polyolefin composition comprising a product of: a non-biodegradable polyolefin-based product and
    an amount of carbon-free fine mineral matter derived from coal and/or mined from natural resources including volcanic basalt, glacial rock dust deposits, iron potassium silicate and/or sea shore deposits, with particle sizes ranging from less than about 50 μm to about 2 μm, forming a biodegradable polyolefin-based product.

2. The biodegradable polyolefin composition according to claim 1, wherein the fine mineral matter comprises at least one transition metal selected from the group consisting of Fe, Cu, Mn, Mo, Zn, Co or combinations thereof at the following concentrations:
    Fe 14,000 to 45,000 ppm;
    Cu 10 to 50 ppm;
    Mn 100 to 700 ppm;
    Mo 1 to 2 ppm;
    Zn 20 to 120 ppm; and
    Co 10 to 15 ppm;
    wherein ppm are measured with ICP-AES method utilizing nitric acid, hydrochloric acid and hydrogen peroxide in a heated digester.

3. The biodegradable polyolefin composition according to claim 1, wherein the fine mineral matter is melt blended, dry blended or compounded with the non-biodegradable polyolefin based product directly or via masterbatches or concentrates to achieve homogeneous dispersion, wherein the concentrations of the mineral matter particles in the masterbatches are in the range of about 3 to 50 wt. %.

4. The biodegradable polyolefin composition according to claim 1, wherein the fine mineral matter comprises of a promoter selected from the alkaline/alkaline earth group consisting of Ca, K, Mg or combinations thereof at the following concentrations:
Ca 1,000 to 18,000 ppm;
K 600 to 4,000 ppm;
Mg 20 to 8,000 ppm; and/or
other acidic or amine promoters.

5. The biodegradable polyolefin composition according to the claim 1, wherein the fine mineral matter comprises at least one additive selected from antioxidants, pigments, IR absorbers, lubricants, unsaturated organic compounds, substituted benzophenones, peroxides, biodegradable plasticizers, waxes, UV and thermal stabilizers, biodegradable polymers and oligomers, or combinations thereof, wherein the antioxidants are used to inhibit oxidative degradation of plastics.

6. The biodegradable polyolefin composition according to claim 1, wherein the concentration of the fine mineral matter in the biodegradable polyolefin-based product ranges from about 0.1 to about 5 wt. %.

7. The biodegradable polyolefin composition according to claim 1, wherein the concentration of the fine mineral matter in the non-biodegradable polyolefin-based product is determined by at least one of the factors comprising: the composition of transition metals in the fine mineral matter, specifics of the non-biodegradable polyolefin resin, climatic conditions and desired useful lifetime of the formulated biodegradable polyolefin.

8. A method according to claim 1 of converting a non-biodegradable polyolefin plastic into a biodegradable polyolefin-based product, comprising:
obtaining an amount of carbon-free fine mineral matter derived from coal and/or mined from natural resources including volcanic basalt, glacial rock dust deposits, iron potassium silicate and/or sea shore deposits with particle sizes ranging from less than about 50 μm to about 2 μm; and
melt blending, dry blending, or compounding the fine mineral matter with the non-biodegradable plastic to form the biodegradable polyolefin-based product.

9. The method according to claim 1, wherein the non-biodegradable plastic is a hydrocarbon based polymer selected from the list consisting of homopolymers or copolymers or mixtures of polyethylene, polypropylene, polybutene, polymethylpentene, polyisobutylene, ethylene propylene copolymers, ethylene propylene rubber, and ethylene propylene diene copolymers.

10. The method according to claim 8, wherein the fine mineral matter comprises at least one transition metal selected from the group consisting of Fe, Cu, Mn, Mo, Zn, Co, or combinations thereof at the following concentrations:
Fe 14,000 to 45,000 ppm;
Cu 10 to 50 ppm;
Mn 100 to 700 ppm;
Mo 1 to 2 ppm;
Zn 20 to 120 ppm; and
Co 10 to 15 ppm;
wherein ppm are measured with ICP-AES method utilizing nitric acid, hydrochloric acid and hydrogen peroxide in a heated digester.

11. The method according to claim 8, wherein the fine mineral matter comprises a promoter selected from the group of alkaline/alkaline earth metals consisting of Ca, K, Mg or combinations thereof at the following concentrations:
Ca 1,000 to 18,000 ppm;
K 600 to 4,000 ppm;
Mg 20 to 8,000 ppm; and/or
other acidic or amine promoters.

12. The method according to the claim 8, wherein the fine mineral matter further comprises at least one additive selected from antioxidants, pigments, IR absorbers, lubricants, unsaturated organic compounds, substituted benzophenones, peroxides, biodegradable plasticizers, waxes, UV and thermal stabilizers, biodegradable polymers and oligomers, or combinations thereof, wherein the antioxidants are used to inhibit oxidative degradation of plastics.

13. The method according to claim 8, wherein the concentration of the fine mineral matter in final products ranges from about 0.1 to about 5 wt. %.

14. The method according to claim 8, wherein the fine mineral matter is added to the non-biodegradable plastic via masterbatches or concentrates to achieve homogeneous dispersion, wherein the concentrations of the mineral matter particles in the masterbatches are in the range of about 3 to about 50 wt. %.

15. The method according to claim 8, wherein the biodegradable plastic can be converted into at least one of a film, a sheet, a fiber, a filament, or a molded form, or combinations thereof.

* * * * *

UNITED STATES PATENT AND TRADEMARK OFFICE
CERTIFICATE OF CORRECTION

PATENT NO. : 10,549,455 B2  
APPLICATION NO. : 16/293814  
DATED : February 4, 2020  
INVENTOR(S) : Yelena Kann Page 1 of 1

It is certified that error appears in the above-identified patent and that said Letters Patent is hereby corrected as shown below:

In the Specification

At Column 11, Line number 54, replace "comprising" with --with--.

At Column 14, Line number 44, add the word –blending– between "of" and "the".

Signed and Sealed this
Twenty-eighth Day of April, 2020

Andrei Iancu
*Director of the United States Patent and Trademark Office*